United States Patent
Starkes

(10) Patent No.: US 8,180,035 B2
(45) Date of Patent: May 15, 2012

(54) DIALING PLAN REMOVAL

(75) Inventor: Steven L. Starkes, Great Neck, NY (US)

(73) Assignee: Verizon New York Inc., New York, NY (US)

(*) Notice: Subject to any disclaimer, the term of this patent is extended or adjusted under 35 U.S.C. 154(b) by 1220 days.

(21) Appl. No.: 11/861,741

(22) Filed: Sep. 26, 2007

(65) Prior Publication Data

US 2009/0080637 A1 Mar. 26, 2009

(51) Int. Cl.
*H04M 3/42* (2006.01)

(52) U.S. Cl. ......... 379/201.01; 379/201.12; 379/216.01; 379/220.01

(58) Field of Classification Search ......... 379/201.01–201.05, 201.12, 220.01, 379/284, 216.01
See application file for complete search history.

(56) References Cited

U.S. PATENT DOCUMENTS

| | | | | |
|---|---|---|---|---|
| 5,875,242 A | * | 2/1999 | Glaser et al. | 379/201.05 |
| 5,974,129 A | * | 10/1999 | Bodnar | 379/220.01 |
| 6,031,904 A | * | 2/2000 | An et al. | 379/201.02 |
| 6,453,032 B1 | * | 9/2002 | Lennert et al. | 379/121.04 |
| 7,116,770 B1 | * | 10/2006 | Tran et al. | 379/201.01 |
| 7,783,031 B2 | * | 8/2010 | Phillips, III | 379/350 |
| 2003/0231759 A1 | * | 12/2003 | Bedingfield et al. | 379/355.01 |

* cited by examiner

*Primary Examiner* — Quynh Nguyen

(57) ABSTRACT

A request to delete a dialing plan is received. A list is generated of switching modules that are connected to a central processor of a telephone switch. Each switching module is queried to determine if the switching module includes a copy of the dialing plan. It is determined whether the dialing plan is in use by querying switching modules that include a copy of the dialing plan. If the dialing plan is not in use, then the dialing plan is deleted from at least one switching module identified as including a copy of the dialing plan.

19 Claims, 2 Drawing Sheets

DIALING PLAN REMOVAL

BACKGROUND INFORMATION

A public switched telephone network (PSTN) provides voice-grade telephone service in most parts of the world, connecting millions of telephones through a world-wide circuit-switched telephone network. To accommodate large numbers of telephone subscribers, a network is generally broken into local regions that are serviced by a central office (CO), which may be the physical building used to house telecommunications equipment. Each CO may include a Class 5 telephone switch.

A Class 5 switch is a large-scale telephone switch that can serve from several hundred to upwards of 100,000 subscribers, covering a city, a town, part of a city, or some other geographic region. A Class 5 switch provides telephone service to subscribers by providing a dial tone, local switching, access to the rest of the network, etc. Generally, a Class 5 switch routes calls by interpreting dialed digits. For example, a Class 5 switch may interpret dialed digits according to one or more dialing plans.

A dialing plan is a set of rules used by a switch to determine how each and every call that comes into the Class 5 switch is processed. One Class 5 switch can include many dialing plans, and each dialing plan is typically assigned to one or more subscribers on a particular switch. Over time, many dialing plans become unused, but remain stored in the switch's memory. Storage of unused dialing plans is undesirable because a Class 5 switch has limited memory, and memory upgrades can be very expensive. However, at present, unused dialing plans may be removed from a switch only through cumbersome, inefficient, and potentially unreliable processes.

DETAILED DESCRIPTION OF THE PREFERRED EMBODIMENTS

Figure 1:
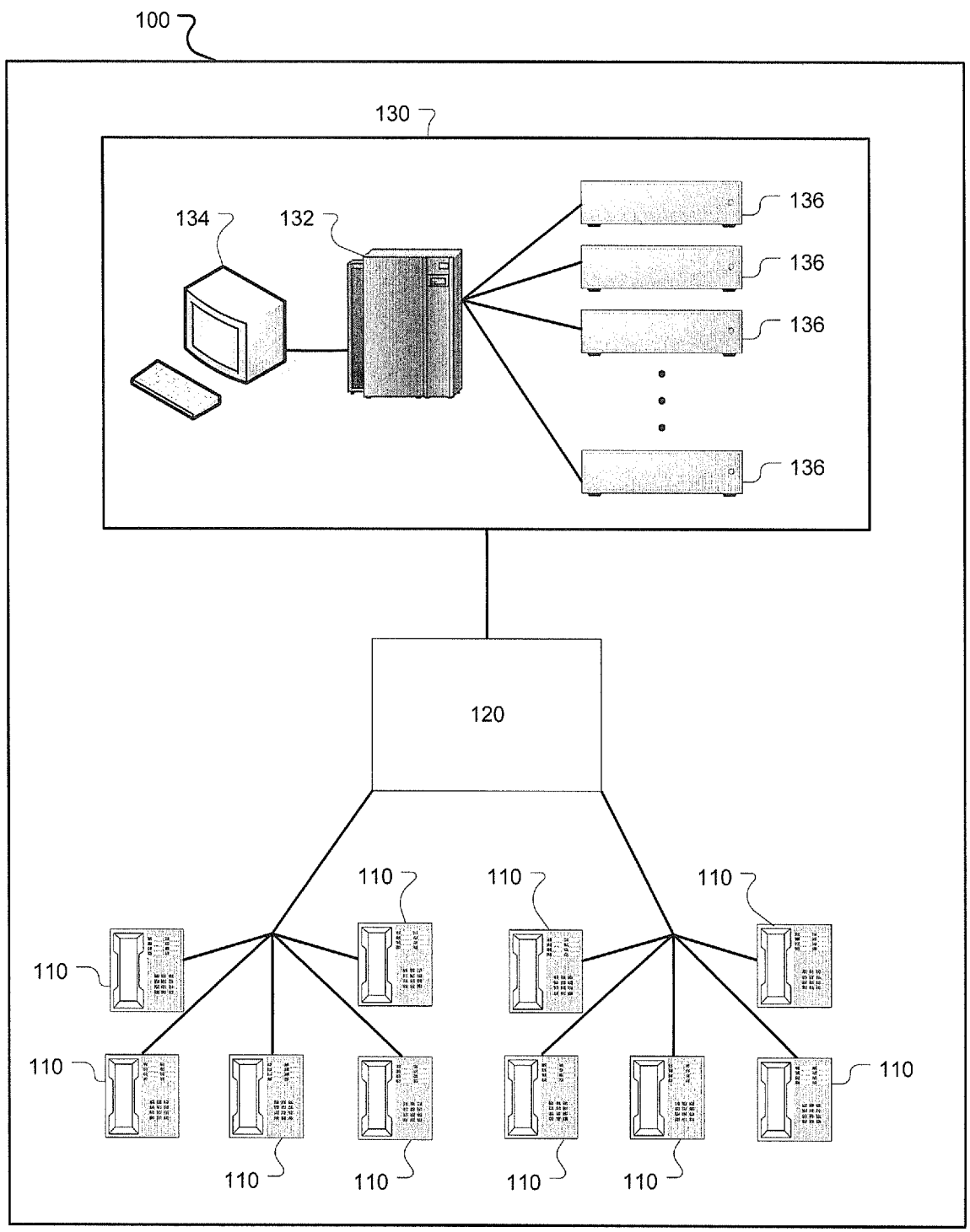
FIG. 1 illustrates a public switched telephone network.

FIG. 1 illustrates an exemplary public switched telephone network (PSTN) 100. PSTN 100 includes telephones 110, intermediary equipment 120, and a Class 5 switch 130. Telephones 110 may be any type of residential or business phone or phone system that is generally connected to Class 5 switch 130. Generally, telephones 110 are connected to switch 130 through intermediary equipment 120. Intermediary equipment 120 may include a telephone network box, telephone poles, an entrance bridge, a digital concentrator, fiber-optic cables, digital equipment, etc.

Class 5 switch 130 provides telephone service to customers within a geographic region, and provides "subscriber type" activities that include: local phone service; toll and long distance service; operator services; data access (modem dial-in service); local switching; access to the rest of the telephone network; implementation of various dialing plans, etc. Switch 130 may be a 5ESS Class 5 telephone switch made by Alcatel-Lucent of Paris, France, although switch 130 could be any other Class 5 telephone switch that could benefit from the removal of unused dialing plans.

A dialing plan, also called an individualized dialing plan (IDP) or a central office exchange service (CENTREX), is a programmable service provided by switch 130. Generally, a dialing plan is programmed within switch 130 to provide customizable switching options based on digits dialed from one or more telephones 110. More specifically, a dialing plan is a set of instructions within switch 130 that determines how switch 130 handles calls from a specified set of one or more telephones 110 based on factors including the particular telephone 110, group of telephones 110, and the combination of dialed digits. The dialing plan specifies what types of service requests can be accommodated by a telephone switch based on the call setup information, the calling number, the called number, and the routes, trunk groups, and trunks (individual circuits) available to switch 130.

In many cases, dialing plans are used by businesses for a myriad of functions, including direct inward dialing (DID), direct extension dialing, dialing restrictions, etc. A dialing plan alleviates the need for businesses to purchase their own switching equipment, such as a private branch exchange (PBX) system, etc. For example, a dialing plan may be used by one company, where the company has several buildings within one local region and all of the company's telephones 110 are connected to one Class 5 switch 130. The dialing plan may, to take just one example, allow a user to dial a three-digit extension to reach another telephone 110, negating the need to dial an entire seven or ten-digit telephone number. In some cases, a dialing plan may impose restrictions, preventing long-distance calls or even preventing a telephone 110 from dialing telephone numbers that are not on a particular list.

Over time, a dialing plan may become unused, i.e., is no longer assigned to any telephone 110, although the dialing plan remains stored in a memory of switch 130. One dialing plan may include multiple loosely related records or instructions stored within one or more digit interpretation tables. In general, it may be difficult to find and remove each record within switch 130, especially when switch 130 includes multiple switching modules.

Switch 130 generally includes a central processor (CNP) 132, a terminal 134, and one or more switching modules 136. CNP 132 provides centralized administration, programming, and management, and handles switching between switch 130 and switches at other central offices. CNP 132 generally includes a processor, memory, and may use any number of different operating systems, including a proprietary operating system, CNP 132 may use a Unix-based operating system, such as the Unix operating system that runs on the Alcatel-Lucent 5ESS switches. Generally, programming of switch 130 may be performed through CNP 132 by using terminal 134, Terminal 134 provides access to CNP 132 and switching modules 136 through either a command-line interface or a menu-driven graphical user interface. Terminal 134 generally provides a display and one or more input devices, such as a monitor and keyboard. Terminal 134 may be a local terminal, directly connected to CNP 132, or terminal 134 may be a remote terminal that allows for access of switch 130 through a local area or wide area network. Generally, terminal 134 allows a technician to program CNP 132 as well as switching modules 136, such as programming various dialing plans.

Switching modules 136 are connected to both CNP 132 and telephones 110, and perform switching operations by interpreting dialed digits and connecting calls between telephones 110. Each switching module 136 generally uses one or more dialing plans to interpret dialed digits. A dialing plan is generally programmed through CNP 132, and then assigned to one or more telephones 110. To assign a dialing plan to a telephone 110, the dialing plan is first programmed in memory in CNP 132. Then, when the dialing plan is assigned to a telephone 110, a copy of the dialing plan is placed in memory on switching module 136 that is connected to that telephone 110. Once a dialing plan is assigned to telephones 110 on switching module 136, the dialing plan and associated dialing strings are copied from CNP 132 into a memory of switching module 136 that is connected to the assigned telephones 110. Thus, copies of one dialing plan may reside in memory in CNP 132, as well as in memory of multiple switching modules 136. Generally, new dialing plans may be assigned to telephones 110, while old dialing plans may be unassigned from telephones 110. Once a dialing plan is unassigned from all telephones 110 on switch 130, it becomes unused and can be deleted. Unfortunately, an unused dialing plan will remain stored in one or more instances of memory in switch 130. Because memory in switch 130 is generally limited and expensive, removing unused dialing plans is generally desirable.

Generally, a dialing plan is identified by a name, whether the name is arbitrary or given by a naming convention. A provisioning center, which generally manages telephone subscribers and assigns dialing plans to particular telephones 110, will determine that a particular dialing plan is unused. Typically, a provisioning center may conduct an internal audit and determine which dialing plans are no longer assigned to any telephones 110. Once identified as potentially unused, a technician can attempt to delete the dialing plan from switch 130.

Figure 2:
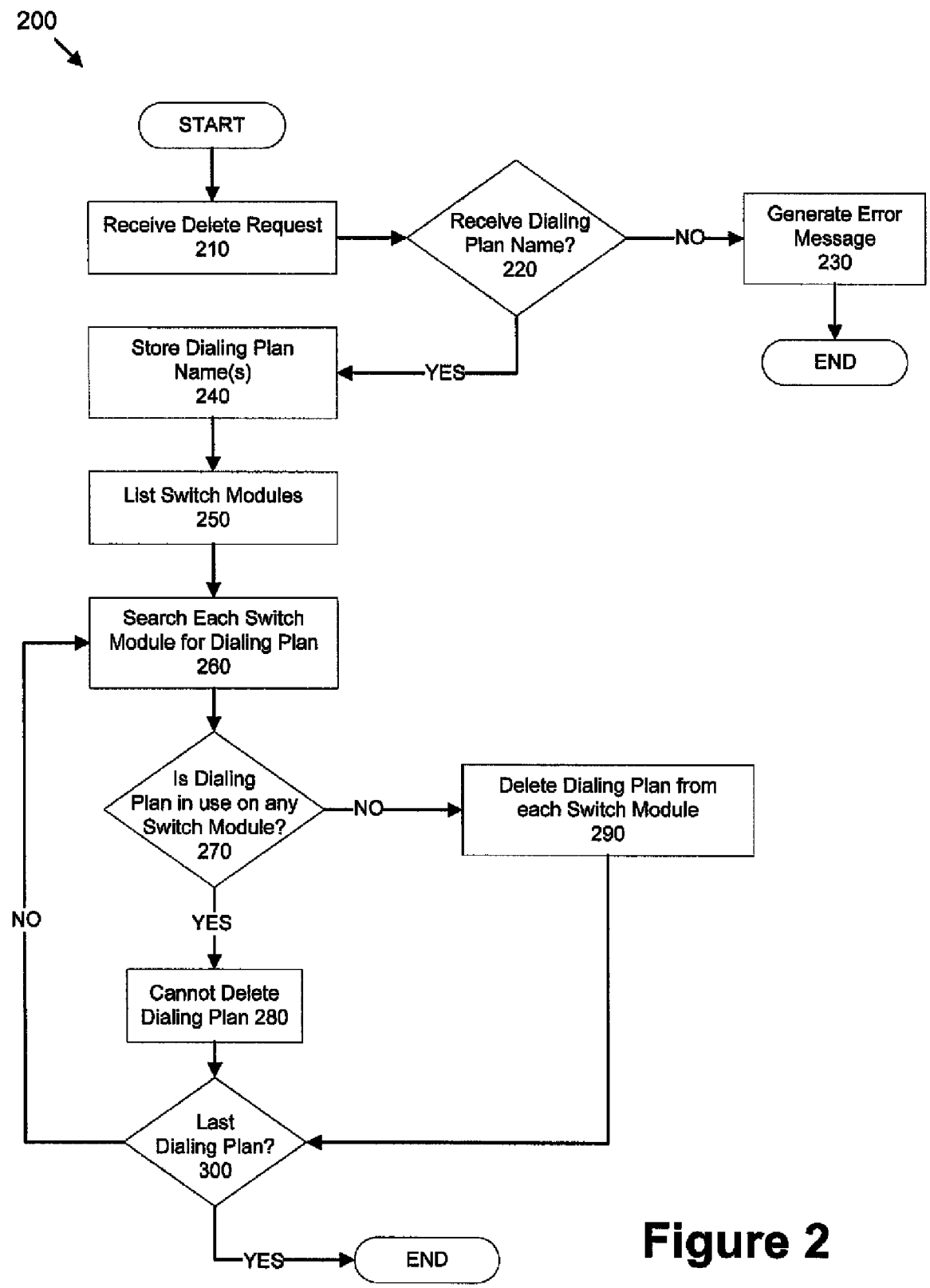
FIG. 2 illustrates an exemplary process for deleting a dialing plan.

FIG. 2 illustrates an exemplary process 200 for automatically removing a particular dialing plan from switch 130. Switch 130 generally includes a computer-readable medium having stored instructions for carrying out certain operations described herein, including some or all of the operations described with respect to process 200. For example, some or all of such instructions may be included in CNP 132 and/or a memory associated therewith. Process 200 may be a computer program that automatically executes process 200 on switch 130. For example, process 200 may be a script that can be uploaded to any number of switches 130 and run remotely through terminal 134. Furthermore, process 200 may be written in any number of different programming languages, including the C programming language, and may be stored in memory within CNP 132 on a computer-readable medium, Process 200 begins in step 210 when CNP 132 receives a request to delete a dialing plan. Generally, the dialing plan will be one identified by a provisioning center as potentially unused. The request could come from a technician, using terminal 134, where the technician calls a computer program and submits a request to CNP 132 to delete a particular dialing plan from switch 130. Such a request may be a command typed through a command-line interface through terminal 134, or a technician may use a menu-driven GUI to request that CNP 132 delete a dialing plan.

Of course, CNP 132 may receive the request to delete a dialing plan as a message or instructions from a computer program. For example, a provisioning center may use a computer program to search and identify potentially unused or obsolete dialing plans. Such a computer program could then compile a list of potentially unused dialing plans, and submit a request to delete the dialing plan to CNP 132. Such a program could submit one request to delete multiple dialing plans, or submit multiple requests, where each request identifies a single dialing plan to delete. Furthermore, such a computer program running at a provisioning center could manage and coordinate the removal of multiple dialing plans across multiple switches 130.

Following step 210, next, in step 220, CNP 132 determines if the input, namely the dialing plan name or list of names, was received and was proper. Generally, CNP 132 receives at least one alpha-numeric dialing plan name with the request in step 210. If the request was received without an accompanying dialing plan name, then process 200 proceeds to step 230. Furthermore, if CNP 132 received a list of dialing plans, and either the list was improperly formatted or one of the names included an inappropriate character, then process 200 likewise proceeds to step 230. If, on the other hand, CNP 132 received a dialing plan name, or a properly formatted list of dialing plan names with the delete request in step 210, then the process continues to step 240.

In step 230, CNP 132 generates an error message detailing the problem with the request submitted in step 210. For example, the error message may inform a user that the request was submitted without a dialing plan name, or that a dialing plan name included an inappropriate character. Furthermore, the error message may also include additional information or instructions informing the user of the correct syntax for submitting the request, including the syntax for submitting a list of dialing plan names. Following step 230, process 200 ends.

In step 240, CNP 132 stores the name or names of the dialing plan. CNP 132 may receive multiple dialing plan names in step 210. For example, a computer program may generate a list of potentially unused dialing plans, and submit a request to CNP 132 to delete every dialing plan on the list from switch 130. Alternatively, a user may submit a list of dialing plan names to delete from switch 130. Generally, process 200 will attempt to delete one dialing plan at a time, starting with the first dialing plan on the list. Once that dialing plan has been processed, process 200 will then attempt to delete the next dialing plan on the list.

Next, in step 250, CNP 132 lists switching modules 136 within switch 130. As discussed above, switch 130 can include multiple switching modules 136, and each switching module 136 may include a copy of a particular dialing plan. Each switching module 136 may be identified by a generally unique identifier. CNP 132 generates a list of switching modules 136 within switch 130, and stores the list of switching modules 136 for use with process 200.

Next, in step 260, CNP 132, using the list generated in step 250, sends a message or query to each switching module 136 requesting a copy of the dialing plan to be deleted. That is, CNP 132 queries each switching module 136 for any dialing strings associated with the dialing plan. To reduce processing time and promote efficiency, process 200 only conducts additional procedures with switching modules 136 that contain a copy of the dialing plan. CNP 132 then modifies the list of switching modules 136 by removing from the list those switching modules 136 that do not include a copy of the dialing plan. The list, as modified, then only contains those switching modules 136 that include a copy of the dialing plan, which is stored in memory on each switching module 136.

Next, in step 270, CNP 132, using the list of switching modules generated in step 250 and as modified in step 260, checks each switching module 136 to determine if the dialing plan is in use. Switching modules 136 that do not contain a copy of the dialing plan can be safely ignored for two reasons, as previously explained. First, the dialing plan is not using valuable memory on those switching modules 136. Second, the dialing plan cannot be in use on a switching module 136 unless that switching module 136 has a copy of the dialing plan. Once a dialing plan is assigned to telephones 110 associated with a switching module 136, the dialing plan and associated dialing strings are copied into memory of the switching module 136. If the dialing plan was never assigned to any telephones 110 on a switching module 136, then the switching module 136 will not include a copy of the dialing plan. To determine if the dialing plan is in use, CNP 132 checks each switching module 136 to determine if the dialing plan is currently assigned to a telephone 110. If the dialing plan is in use, i.e., currently assigned to a telephone 110 on a switching module 136, then process 200 proceeds to step 280. If the dialing plan is not in use on any switching module 136, then process 200 proceeds to step 290. Of course, CNP 132 may check multiple switching modules 136 simultaneously, or one at a time, and store the results for use with process 200.

In step 280, CNP 132 recognizes that the particular dialing plan remains in use and process 200 proceeds to step 300, without deleting any copies of the dialing plan from any switching modules 136. CNP 132 may generate an error message informing the technician that the dialing plan is currently in use, and may provide additional information, such as the identification of switching module or modules 136 where the dialing plan is assigned to telephones 110.

In step 290, CNP 132, using the list of switching modules generated in step 250 and as modified in step 260, deletes the dialing plan from each switching module 136 in switch 130 that includes a copy of the dialing plan. Depending on the make and model of switch 130, CNP 132 may have to move the dialing plan from each switching module 136 to memory in CNP 132, and then delete the dialing plan from memory within CNP 132. After deleting the dialing plan from switching modules 136, process 200 proceeds to step 300.

Next, in step 300, CNP 132 determines if the dialing plan was the last dialing plan in a list to be deleted, namely the list as stored in CNP 132 in step 240. If the current dialing plan was indeed the last one in a list, then process 200 ends. If there are additional dialing plans in the list to delete, then process 200 proceeds to step 260 and attempts to delete the next dialing plan on the list.

Of course, process 200 may delete dialing plans from individual switching modules 136, even though that dialing plan is currently in use on other switching modules 136 within switch 130. Unused dialing plans could thereby be removed from individual switching modules 136, reducing memory consumption on those switching modules 136 where the dialing plan is not currently in use. For example, in step 270, CNP 132 checks each switching module 136 to determine if the dialing plan is in use by determining if the dialing plan is currently assigned to a telephone 110 on that particular switching module 136. If the dialing plan is in use on a switching module 136, then the list of switching modules 136 generated in step 250 and as modified in step 260, could be further modified by removing those switching modules 136 where the dialing plan is currently in use, i.e., currently assigned to a telephone 110. Under this scenario, in step 290, CNP 132, using the list of switching modules 136 generated in step 250 and as modified in steps 260 and 270, deletes the dialing plan from each switching module 136 where (1) the switching module 136 includes a copy of the dialing plan, and (2) the dialing plan is not currently in use on that particular switching module 136.

Process 200 may include additional steps. For example, before step 220, process 200 may include additional error checking steps to reduce potential errors. For example, process 200 may check the version of the operating system on CNP 132, and may end prematurely if process 200 is running on a non-compliant or untested operating system version.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

I claim:

1. A method, comprising:
    receiving a request to delete a dialing plan;
    generating a list of switching modules that are connected to a central processor of a telephone switch;
    querying each switching module to determine if the switching module includes a copy of the dialing plan;
    determining whether the dialing plan is in use by querying switching modules that include a copy of the dialing plan; and
    if the dialing plan is not in use, then deleting the dialing plan from at least one switching module identified as including a copy of the dialing plan.

2. The method of claim 1, further comprising selectively receiving the request to delete a dialing plan from one of a computer program and a user at a terminal, the request including at least one of an alpha-numeric dialing plan name and a list of dialing plans.

3. The method of claim 1, wherein querying each switching module to determine if the switching module includes a copy of the dialing plan includes searching the switching module for a dialing string associated with the dialing plan.

4. The method of claim 1, wherein the dialing plan is deleted from a particular switching module if the dialing plan is not in use on that particular switching module.

5. The method of claim 1, wherein the dialing plan is deleted from each switching module identified as including a copy of the dialing plan if the dialing plan is not in use on any switching module.

6. The method of claim 1, wherein the dialing plan is determined to be in use if the dialing plan is currently assigned to at least one telephone on a switching module.

7. The method of claim 1 tangibly embodied as computer-executable instructions stored on a computer-readable medium.

8. A method, comprising:
   receiving a request to delete a dialing plan from a telephone switch;
   generating a list of switching modules within the telephone switch;
   querying each switching module for a copy of the dialing plan;
   receiving a response from each switching module indicating whether the switching module includes a copy of the dialing plan;
   storing a list of switching modules that include a copy of the dialing plan;
   determining whether the dialing plan is currently assigned to a telephone, wherein only the switching modules that include a copy of the dialing plan are queried to determine if the dialing plan is currently assigned to a telephone; and
   deleting the dialing plan from a switching module if the dialing plan is not currently assigned to a telephone.

9. The method of claim 8, further comprising selectively receiving the request to delete a dialing plan from one of a computer program and a user at a terminal, the request including at least one of an alpha-numeric dialing plan name and a list of dialing plans.

10. The method of claim 8, further comprising searching each switching module for dialing strings associated with the dialing plan.

11. The method of claim 8, wherein deleting the dialing plan from one switching module further comprises:
    moving the copy of the dialing plan to a central processor; and
    deleting the copy of the dialing plan from the central processor.

12. The method of claim 8, wherein the dialing plan is deleted from each switching module identified as including a copy of the dialing plan if the dialing plan is not currently assigned to a telephone on any switching module.

13. The method of claim 8 tangibly embodied as computer-executable instructions stored on a computer-readable medium.

14. A system for removing an unused dialing plan from a Class 5 telephone switch, comprising:
    a central processor;
    a switching module in communication with the central processor;
    a terminal in communication with the central processor; and
    a plurality of telephones connected to the switching module, wherein the central processor is configured to:
    receive a request to delete a dialing plan;
    query the switching module for a copy of the dialing plan;
    receive a response from the switching module in response to the query; determine whether the dialing plan is in use; and
    delete the dialing plan from the switching module if the dialing plan is not in use.

15. The system of claim 14 further comprising a plurality of switching modules.

16. The system of claim 15, wherein the central processor is further configured to
    search each switching module for a copy of the dialing plan,
    determine if the dialing plan is currently assigned to a telephone on any switching module, and
    delete the dialing plan from each switching module if the dialing plan is not currently assigned to a telephone on any switching module.

17. The system of claim 15, wherein the central processor is further configured to identify a group of switching modules where the dialing plan is not currently in use, and delete the dialing plan from each switching module identified in the group.

18. The system of claim 14, wherein the central processor is further configured to delete a copy of the dialing plan from the switching module by first moving the dialing plan to a computer-readable medium within the a central processor, and then deleting the copy of the dialing plan from the computer-readable medium within the a central processor.

19. The system of claim 14, wherein the central processor is further configured, when querying the switching module to determine if the switching module includes a copy of the dialing plan, to search the switching module for a dialing string associated with the dialing plan.

* * * * *